(12) United States Patent
Fayt

(10) Patent No.: US 10,059,355 B2
(45) Date of Patent: Aug. 28, 2018

(54) COMMUNICATION DEVICE FOR RAIL VEHICLE, RAIL VEHICLE EQUIPPED WITH SAID DEVICE

(71) Applicant: ALSTOM TRANSPORT TECHNOLOGIES, Levallois-Perret (FR)

(72) Inventor: Etienne André Maurice Fayt, Nimy (BE)

(73) Assignee: ALSTOM TRANSPORT TECHNOLOGIES, Levallois-Perret (FR)

(*) Notice: Subject to any disclaimer, the term of this patent is extended or adjusted under 35 U.S.C. 154(b) by 124 days.

(21) Appl. No.: 14/490,179

(22) Filed: Sep. 18, 2014

(65) Prior Publication Data

US 2015/0080041 A1    Mar. 19, 2015

(30) Foreign Application Priority Data

Sep. 19, 2013  (FR) ...................................... 13 59029

(51) Int. Cl.
| | |
|---|---|
| *H04K 3/00* | (2006.01) |
| *H04W 84/12* | (2009.01) |
| *B61L 15/00* | (2006.01) |
| *H04B 1/04* | (2006.01) |
| *B61L 3/12* | (2006.01) |

(52) U.S. Cl.
CPC ............ *B61L 15/0027* (2013.01); *B61L 3/125* (2013.01); *H04B 1/0475* (2013.01); *H04K 3/42* (2013.01); *H04K 3/43* (2013.01); *H04K 3/84* (2013.01); *H04K 2203/18* (2013.01); *H04K 2203/22* (2013.01); *H04W 84/12* (2013.01)

(58) Field of Classification Search
CPC ....... H04B 1/0475; H04B 1/0458; H04K 3/45
See application file for complete search history.

(56) References Cited

U.S. PATENT DOCUMENTS

| | | | |
|---|---|---|---|
| 6,782,044 B1* | 8/2004 | Wright ................ B61L 15/0027 375/224 |
| 2005/0277411 A1* | 12/2005 | Utsunomiya ......... H04W 24/00 455/434 |
| 2006/0270470 A1 | 11/2006 | de La Chapelle et al. |
| 2011/0279337 A1* | 11/2011 | Corwin .................. H01Q 1/088 343/713 |
| 2014/0094165 A1* | 4/2014 | Karlsson ............... H04W 16/14 455/423 |
| 2014/0198760 A1 | 7/2014 | Meyrath |
| 2015/0142225 A1* | 5/2015 | Tonguz .................. B61L 19/06 701/19 |

FOREIGN PATENT DOCUMENTS

| | | | |
|---|---|---|---|
| CA | 2299778 A1 * | 8/2000 | .............. H04Q 7/24 |
| DE | 102010027131 A1 | 1/2012 | |
| DE | 102011079972 A1 | 1/2013 | |
| WO | 2012007249 A1 | 1/2012 | |

* cited by examiner

*Primary Examiner* — Dong-Chang Shiue
(74) *Attorney, Agent, or Firm* — Thompson Coburn LLP

(57) ABSTRACT

This communication device for rail vehicle is of the type comprising a wireless communication stage to communicate with a control beacon on at least one communication spectrum band of a spectral range sub-divided into several predetermined channels.

9 Claims, 3 Drawing Sheets

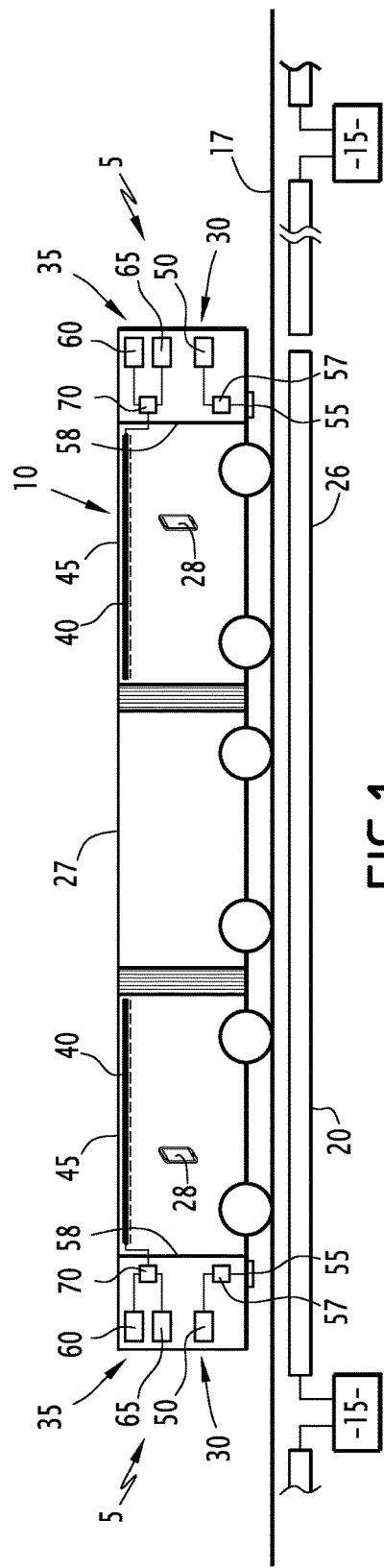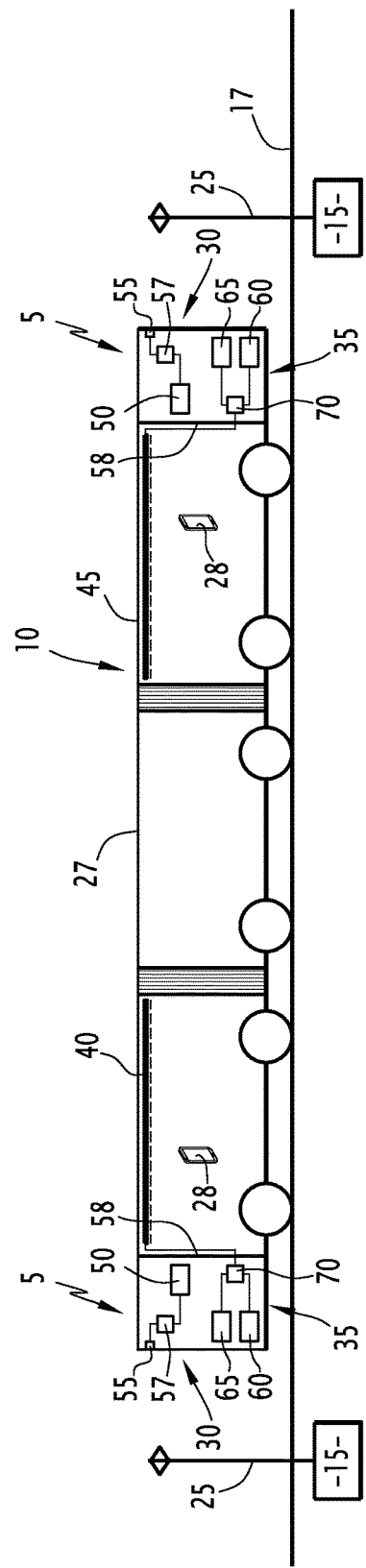

COMMUNICATION DEVICE FOR RAIL VEHICLE, RAIL VEHICLE EQUIPPED WITH SAID DEVICE

CROSS-REFERENCE TO RELATED APPLICATION

This application claims benefit of French Application No. 13 59029 filed Sep. 19, 2013, which is incorporated by reference herein in its entirety.

BACKGROUND

The present invention concerns a communication device for rail vehicle of the type comprising a wireless communication stage to communicate with a control beacon on at least one communication spectrum band of a spectral range sub-divided into several predetermined channels.

The invention applies to the field of rail safety and more particularly but not specifically to the safety of metropolitan transport.

Conventionally rail vehicles are equipped with a communication stage to communicate with control beacons arranged along the trackside. Such beacons allow the real-time control for example of railway traffic.

Communication between the beacons and the communication stage generally uses radiofrequency electromagnetic waves as support e.g. waves with a frequency in the 2400 MHz-2489.5 MHz band, or above 5 GHz. Said frequency ranges are not generally exclusively allocated and are freely used for example by mobile devices of the public at large, such as mobile telephones, pads or laptop computers.

The presence of such mobile devices in large number on board a rail vehicle, in particular close to the communication stage e.g. during rush hours may perturb and even interrupt communication between the communication stage and the control beacons. The conditions of safe travel are such that in the event of disruption of train-ground communications the rail vehicle must be immobilised. The perturbation of train-ground communication by terminals used by passengers therefore particularly has the effect of momentarily interrupting the travel of the rail vehicle, the consequence of which is to reduce the quality of service offered to users.

SUMMARY OF THE INVENTION

It is one objective of the invention to propose a communication device with which it is possible to obtain better reliability and better availability of train-ground communication.

For this purpose the subject of the invention is a communication device for rail vehicle, of the aforementioned type, characterized in that it further comprises a protection stage linked to a protection antenna, the protection stage being able to generate signals on at least one of the predetermined channels which at least partly cover the or each communication spectrum band, and the protection antenna being able to radiate the generated signals in the direction of at least one coach of the said rail vehicle.

Third party devices such has described above are therefore no longer able to occupy the channels on which the protection stage transmits signals.

According to particular embodiments, the invention has one of more of the following characteristics taken alone or in any technically possible combination.

- the protection stage is able continuously to transmit signals over time on the or on each predetermined channel;
- the or each communication band is narrower than a predetermined channel of the multichannel range;
- the communication stage comprises screening means able to attenuate the signals radiated by the protection antenna;
- the communication stage comprises filtering means able to attenuate signals whose frequency belongs to predetermined channels which do not cover the or each communication band;
- the characteristics of the spectrum band are defined by standard IEEE 802.11;
- the protection stage is able to transmit signals which comprise data frames on layer 2 level of the OSI model.

A further subject of the invention is a rail vehicle characterized in that it comprises a communication device such as defined above.

The rail vehicle may comprise one or more of the following characteristics taken alone or in any technically possible combination:

- the protection antenna is able to radiate in the direction of at least one of the coaches of the rail vehicle which are located in the vicinity of the installation point of the communication stage of the communication device on board the rail vehicle.

BRIEF DESCRIPTION OF THE DRAWINGS

The invention will be better understood with the help of the following description given solely as an example and with reference to the appended drawings in which:

FIG. 1 is a schematic of a rail vehicle comprising a communication device according to a first embodiment;

FIG. 2 is a schematic of a rail vehicle comprising another communication device according to a second embodiment;

FIG. 2 is inactive;

DETAILED DESCRIPTION

Figure 3:
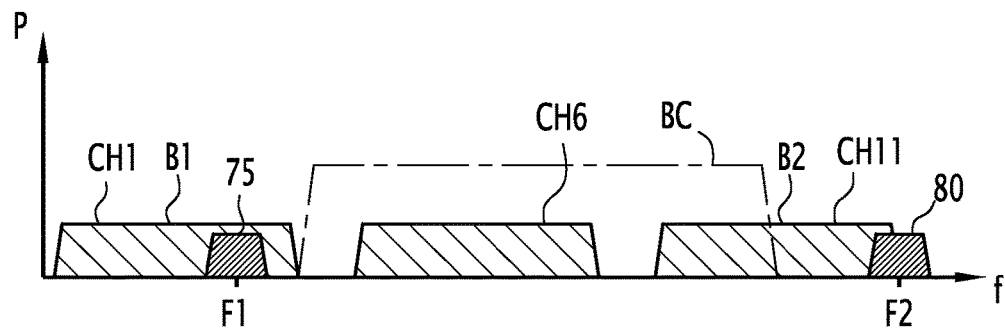
FIG. 3 is a spectrum schematically illustrating the power radiated on some channels of a spectrum range when the protection stage of the communication device in FIG. 1

The wireless communication device 5 illustrated in FIG. 1 is arranged on board a rail vehicle 10 for contactless communication with control beacons 15 arranged on the trackside 17 of the moving rail vehicle 10. Communication between the communication device 5 and the control beacons 15 takes place either by electromagnetic coupling via a waveguide 20 as can be seen in FIG. 1 or by airway via beacon antennas 25 as illustrated in FIG. 2.

The control beacons 15 define spatial cells 26 along the rail track 17, each cell 26 being associated with a communication frequency. The communication frequencies are a low frequency F1 for example and a high frequency F2, F2 being higher than F1, and are alternately allocated to the successive cells 26 along the trackside 17.

The communication frequencies belong to the spectra defined by standard IEEE 802.11.

The rail vehicle 10 comprises coaches 27 to receive passengers, in particular passengers carrying mobile communication devices 28.

The communication device 5 comprises a communication stage 30, a protection stage 35 and a protection antenna 40.

The protection antenna 40 is arranged in a coach 27 of the rail vehicle 10, in particular in an end coach 45. Advantageously, the communication stage 30 is arranged in the same coach 27 as the protection the antenna 40. Preferably, only the coaches 27 of the railway vehicle 10 that comprise a communication stage 30 are equipped with a protection antenna 40.

The protection antenna 40 is arranged in an end coach 45 of the rail vehicle 10.

The protection antenna 40 is a coaxial cable for example whose shielding has been altered to enable the cable to radiate some of the electric signals passing through it.

The communication stage 30 comprises a transmitter-receiver module 50 and a communication antenna 55. The communication stage further comprises filtering means 57 and screening means 58.

The transmitter-receiver module 50 is able to communicate with the control beacons 15 via the communication antenna 55, by electromagnetic coupling between the communication antenna 55 and the waveguide 20 as illustrated in FIG. 1, or by free propagation between the communication antenna 55 and the beacon antennas 25 as illustrated in FIG. 2.

The filtering means 57 are able to perform spectral filtering of a signal received from the communication antenna 55.

The screening means 58 are a caisson for example to insulate the communication stage 30 electrically from the protection antenna 40, whilst allowing communication between the communication stage 30 and the control beacons 15.

The protection stage 35 comprises a first transmitter 60 to generate signals on a first spectrum band B1, and a second transmitter 65 to generate signals on a second spectrum band B2. The protection stage 35 further comprises a coupler 70.

The signals generated by the first and second transmitters 60, 65 are preferably frames at layer 2 of the OSI model such as described in standard IEEE 802.11. The frames are composed of a header, a payload and end in a CRC code (« Cyclic Redundancy Check» ) which is used by the receiver to check whether or not a frame has been properly received. The frames are generated by the transmitters 60 and 65 in sequence without interruption in time.

The first transmitter 60 and the second transmitter 65 are linked to inputs of the coupler 70.

The protection antenna 40 is electrically connected to an output of the coupler 70 to radiate a combination of signals applied by the first transmitter 60 and the second transmitter 65 to the input of the coupler 70.

Figure 5:
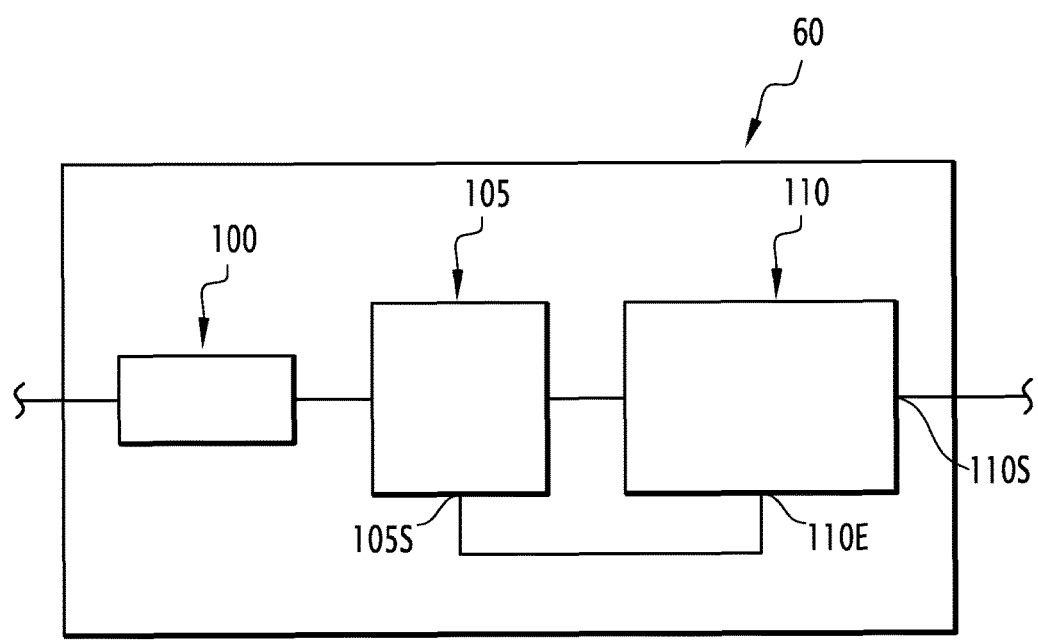
FIG. 5 is a schematic representation of a transmitter of a communication device according to the invention.

For example, as illustrated in FIG. 5, the first and second transmitters 60, 65 comprise an Ethernet interface 100, a baseband processing unit 105 and a radio frequency module 110 linked in series.

The Ethernet interface 100 is capable of receiving information about the configuration of the transmitters 60, 65, for example information from a ground-based rail traffic management system or from a computer arranged on-board the railway vehicle 10. Such information is for example the value of the low frequency F1, the value of the high frequency F2, the power of the signals to be generated or the length of the frames to be generated.

The baseband processing unit 105 is able to supply a signal comprising baseband frames. More particularly, the baseband processing unit 105 is able to supply a signal comprising baseband frames whose characteristics are function of the configuration information received by the Ethernet interface 100.

The radio frequency module 110 is able to transpose the signal provided by the baseband processing unit 105 in order to generate a radio-frequency signal comprising frames and having a frequency F1, F2 that is associated with the corresponding transmitter 60, 65.

An output 110S of the radio frequency module 110 is linked to the protection antenna 45 to apply said radio-frequency signal on said protection antenna 45.

Advantageously, the baseband processing unit 105 is also able to receive, from the Ethernet interface 100, the piece of information related to the value of the frequencies F1, F2. As shown in FIG. 5, the baseband processing unit 105 then comprises an output 105S connected to an input 110E of the radio frequency module 110 for controlling the transposition frequency of the signal supplied by the baseband processing unit 105, said transposition frequency being equal to the frequency F1, F2.

Figure 4:
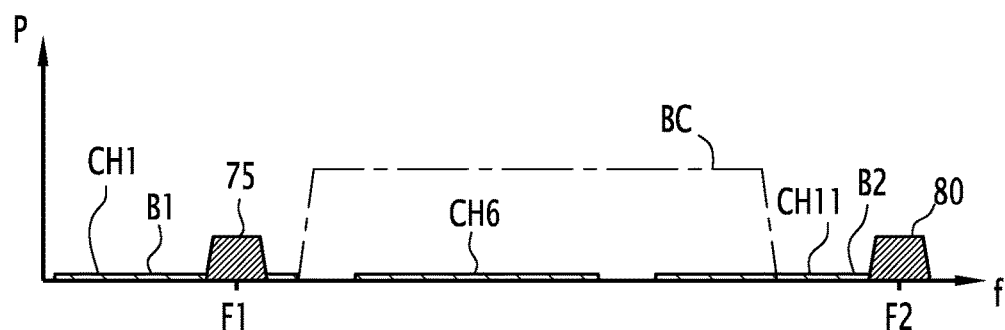
FIG. 4 is a spectrum similar to the spectrum in FIG. 3 given when the protective stage is active.

The communication device 5 whose functioning is illustrated in FIGS. 3 and 4, operates over the range 2400 MHz-2489.5 MHz. This range is subdivided into a plurality of predetermined channels conforming to standard IEEE 802.11. According to standard IEEE 802.11, the channels of the 2400 MHz-2489.5 MHz band have a width of 20 MHz.

The communication stage 30 is able to transmit and receive signals on a low communication spectrum band 75 and on a high communication spectrum band 80, respectively centred on the low frequency F1=2417 MHz, and on the high frequency F=2472 MHz. Each spectrum band 75, 80 has a width of 5 MHz.

The low frequency F1 here corresponds to the central frequency of channel « 2» of the 2400 MHz-2489.5 MHz band in accordance with standard IEEE 802.11.

The high frequency F2 here corresponds to the central frequency of channel « 13» of the 2400 MHz-2489.5 MHz band in accordance with standard IEEE 802.11.

Advantageously, the spectral bands 75, 80 are selected so that the corresponding channels do not interfere with at least one other channel of the multichannel spectral range.

In general, mobile devices 28 transmit on channel « 1» , channel « 6» and channel « 11» of the 2400 MHz-2489.5 MHz band in accordance with standard IEEE 802.11, respectively designated by the references CH1, CH6 and CH11 in these Figures.

Therefore channel « 1» covers the low spectrum communication band 75 and channel « 11» covers the high spectrum communication band 80.

The first spectrum band B1 of the first transmitter 60 of the protection stage 35 is channel « 1» CH1 as per standard IEEE 802.11.

The second spectrum band B2 of the second transmitter 65 of the protection stage 35 is channel « 11» CH11 as per standard IEEE 802.11.

The filtering means 57 are a linear band-cut filter for example whose cut-off band extends from 2422 MHz to 2462 MHz, and is designated by the reference BC in these same Figures.

When in operation, as the rail vehicle 10 travels along the rail track 17, the communication stage 30 communicates with the successive control beacons 15, alternately at frequency F1 and at frequency F2 due to the successive passing of the communication device 5 from one cell to the following cell 26.

The protection means, formed by the protection stage 35 and the protection antenna 40, continuously (i.e. with high repeat frequency and with no transmission delay between packets so as continuously to occupy a channel over time) transmit frames on channel « 1 » CH1 and channel « 11 » CH11 to congest these channels.

The antenna 40 is preferably able to radiate signals chiefly in the direction of the end coaches 45 of the rail vehicle, located in the vicinity of the installation point of the antenna 40 on board the rail vehicle 10.

Therefore to communicate, any mobile devices 28 being used in the end coaches 45 can no longer use either channel « 1 » CH1, or channel « 11 » CH11. They can only use another channel e.g. channel « 6 » CH6.

The filtering means 57 filter the signals transmitted by the mobile communication devices 28 on channel « 6 » CH6.

In addition, the screening means 58 attenuate the signals reaching the communication stage 30 after they have been transmitted by the protection stage 35 and radiated by the protection antenna 40.

As a result, the power of the signals sent by the control beacons 15 and received by the communication stage 30 on each of the low 75 and high 80 communication bands prevails over the power of the signals transmitted either by the mobile communication devices 28 on channel « 6 » CH6, or by the first transmitter 60 on channel « 1 » CH1, or by the second transmitter 65 on channel « 11 » CH11.

The invention claimed is:

1. A communication device for rail vehicle, of the type comprising a wireless communication apparatus,
   - the wireless communication apparatus comprises a transmitter-receiver module and a communication antenna, the transmitter-receiver module communicating, via the communication antenna, with control beacons arranged along a trackside for a real-time control of railway traffic,
   - the communication between the transmitter-receiver module and the control beacons being established on at least one communication spectral band of a spectral range subdivided into several predetermined channels,
   - the spectral range being not exclusively allocated to the communication between the wireless communication apparatus and the control beacon but capable of being used by a terminal used by a passenger located in a coach of the rail vehicle,
   - wherein said communication device further comprises a directional antenna and a protection apparatus that is linked to the directional antenna,
   - the protection apparatus, which protects the communication between the transmitter-receiver module and the control beacon against perturbations by the terminal used by the passenger, generates signals on at least one predetermined channel of the predetermined channels subdividing the spectral range, the at least one predetermined channel covering the at least one communication spectral band while the at least one communication spectral band is used by the communication apparatus communicating with the control beacon, and
   - the directional antenna radiating the signals generated by the protection apparatus in the direction of the coach of the rail vehicle where the passenger is located, in order to prevent the terminal used by the passenger use of the at least one predetermined channel.

2. The device according to claim 1, wherein the protection apparatus transmits signals continuously over time on the or on each predetermined channel.

3. The device according to claim 1, wherein the or each communication band is narrower than a predetermined channel of the multi-channel spectral range.

4. The device according claim 1, wherein the communication apparatus comprises screening means attenuating the signals radiated by the directional antenna.

5. The device according to claim 1, wherein the communication apparatus comprises filtering means attenuating signals whose frequency belongs to predetermined channels which do not cover the or each communication band.

6. The device according to claim 1, wherein the characteristics of the spectral range are defined by standard IEEE 802.11.

7. The device according to claim 1, wherein the protection apparatus transmits signals which contain data frames at level 2 of the OSI model.

8. A rail vehicle, wherein the rail vehicle comprises a communication device according to any of claims 1 to 7.

9. The rail vehicle according to claim 8, wherein the directional antenna radiates in the direction of at least one of the coaches of the rail vehicle which are located in the vicinity of the installation point of the communication apparatus of the communication device on board the rail vehicle.

* * * * *